United States Patent [19]

Druzhinin et al.

[11] 4,329,219

[45] May 11, 1982

[54] ELECTRODE FOR ELECTROCHEMICAL PROCESSES

[76] Inventors: Ernest A. Druzhinin, ulitsa Gvardeiskaya, 4, kv. 32; Vladimir L. Kubasov, ulitsa Kirovogradskaya, 4, korpus 2, kv. 135; Vladimir B. Busse-Machukas, Izmailovsky bulvar, 37, kv. 27; Florenty I. Lvovich, 1 Nizhne-Mikhailovsky proezd, 16, kv. 55; Evgeny L. Krongauz, Bolshaya Andronievskaya ulitsa, 20, kv. 487; Leonid I. Jurkov, ulitsa Tashkentskaya, 22, korpus 1, kv. 124, all of Moscow, U.S.S.R.

[21] Appl. No.: 89,042

[22] Filed: Oct. 29, 1979

[51] Int. Cl.$^3$ .................. C25B 11/08; C25B 11/10; B05D 1/00; B05D 3/02
[52] U.S. Cl. .................. 204/290 F; 204/291; 427/126.5
[58] Field of Search .............. 204/290 R, 290 F, 291; 427/126.3, 126.5

[56] References Cited

U.S. PATENT DOCUMENTS 3,632,498  1/1972  Beer ............................ 204/290 F
3,663,414  5/1972  Martinsons et al. ............. 204/290 F
3,672,990  6/1972  Beck et al. .................. 204/290 F X
3,677,815  7/1972  Keith et al. ................. 204/290 F X

FOREIGN PATENT DOCUMENTS 748142   9/1970   Belgium ........................ 204/290 F
2714488  10/1977  Fed. Rep. of Germany ... 204/290 F
2040116  1/1971   France .
1168558  10/1969  United Kingdom .
1463553  2/1977   United Kingdom .
369923   4/1973   U.S.S.R. .

*Primary Examiner*—F. Edmundson
*Attorney, Agent, or Firm*—Steinberg & Raskin

[57] ABSTRACT

An electrode comprising a current-conducting base having deposited thereon an active mass of the following composition, in percent by mass:

| | |
|---|---|
| silica | 10-90 |
| platinum group metal oxides | 5-45 |
| oxides of passivating metals | 5-45. |

The electrode of this invention is useful as anodes in the production of chlorine and caustic soda, as well as in electrolytic processes of producing chlorates and hyperchlorites.

5 Claims, No Drawings

ELECTRODE FOR ELECTROCHEMICAL PROCESSES

FIELD OF THE INVENTION

The present invention relates to electrodes employed in electrochemical processes, comprising a current-conducting substrate with an active mass consisting of metal oxides and silicon deposited thereon. The electrode according to the present invention is intended for use as anodes in the electolysis of solutions of alkali metal chlorides, to give chlorine and caustic soda in electrolyzers with a mercury cathode, and in electrolyzers with a filtering membrane, as well as in electrolytic processes for the production of chlorates and hypochlorite; and in the processes of electroorganic synthesis, electrochemical purification of waste waters, and regeneration of chlorine-containing etching solutions.

BACKGROUND OF THE INVENTION

Known in the art are graphite anodes employed in different electrochemical processes. Graphite anodes have certain advantages residing in the use of a readily-available electrode material, and insensitivity to shortings. At the same time, graphite anodes have a higher potential of chlorine liberation and, consequently, a higher voltage at the electrolyzer, a high rate of wear of the anode material, thus causing frequent dismounting of electrolyzer equipment to replace anode sets. Graphite anodes have substantial overall dimensions and weight resulting in unreasonably high overall dimensions of electrolyzers and working areas in electrolytic workshops.

At present, electrodes with a conducting base and an active mass deposited thereon are extensively used in the art. The current-conducting base is made of a metal passivating under anodic polarization, such as titanium, tantalum, zirconium, niobium or alloys of these metals. The current-conducting base may be of any required shape, such as a flat plate with or without perforations, as a rod, screen, grate or a metalloceramic body.

The active mass contains oxides or mixtures of oxides of metals pertaining to the group of platinum such as ruthenium, iridium; or oxides of passivating metals such as titanium and zirconium. The active mass is applied onto the base in a thin layer with a thickness of from 3 to 10 mcm. Metal-oxide anodes, as compared to graphite ones, have improved electrochemical characteristics, a lower potential of chlorine liberation, unchangeable dimensions during a long-term service period, lower overall dimensions and weight, a high stability of the active mass and a long run (several years) between replacements of the anode sets.

Also widely used in the art are metal-oxide anodes containing in their active mass $RuO_2$ in the amount of 46% by weight and $TiO_2$ in the amount of 54% by weight (cf. USSR Inventor's Certificate No. 369923). The rate of consumption of the active mass under stationary conditions of chlorine electrolysis at a current density of 0.2–0.4 A/cm$^2$ is equal to $2.6 \times 10^{-8}$ g/cm$^2$.hr as determined by the radiochemical method. The method of radiochemical analysis comprises subjecting a sample with the active mass to irradiation with a flux of neutrons ($1.2-3 \times 10^-$neutrons/cm$^2$.sec) for a period of from 200 to 400 hours and then the radioactive isotope of ruthenium is quantitatively determined during electrolysis in a solution, slime or gas phase.

To determine the stability of the active mass, we have used the method of variable polarity and amalgamation which is extensively employed as an express-method for the control of quality of an active coating, namely its stability upon amalgamation, adherence to the current-conducting substrate, resistance against cathodic polarization and shortings.

The method of variable polarity and amalgamation resides in the following. A test sample is alternatively subjected to anodic and cathodic polarization for 40 minutes (2 minutes—anodic polarization, 2 minutes—cathodic) at the current density of 1 A/cm$^2$, temperature of 60° C. in a solution with the content of sodium chloride of 300 g/l. One cycle of tests lasts for 40 minutes. Then the anode is dipped for 30 seconds into sodium amalgam with its concentration of 0.2% by mass. After these tests the anode is washed in distilled water, dried and its weight loss is then determined.

The results of measurements of consumption of the active mass of said anode determined by the method of variable polarity and amalgamation are shown in the following Table 1.

TABLE 1

| Number of test cycles | 1–3 | 4–6 | 7–9 | 10–12 | 13–15 | 16–18 |
|---|---|---|---|---|---|---|
| Consumption of active mass for every 3 test cycles, mg/cm$^2$ | 0.595 | 0.610 | 0.140 | 0.180 | 0.190 | 0.170 |

As is seen from the results of radiochemical tests and the results shown in Table 1 above, the anodes currently employed on a large scale in electrolysis in many countries of the world still have an insufficient resistance of the active mass against amalgamation under the conditions or mercury electrolysis; and insufficient stability, relatively high consumption rates of noble metal for the manufacture of the anodic coating. In the chlorine electrolysis with a mercury cathode, the service life of anodes does not exceed 1–2 years; under conditions of membrane electrolyzers the service life of such anodes is not longer than 4–5 years.

Known in the art is an electrode, wherein there is deposited onto a titanium current-conducting base, for the purpose of increasing the electrode stability, an oxide of a metal of the platinum group and considerable amounts of silica. For example, the active mass contains 42% by mass of $RuO_2$ and 58% by mass of $SiO_2$. The rate of consumption of the active mass of this anode, as determined by the method of variable polarity and amalgamation, is 0.99–1.20 mg/cm$^2$ for 3 test cycles (cf. French Pat. No. 2,040,116 or U.S. Pat. No. 3,846,273).

Also known are electrodes with their active mass containing silica with titania or with an oxide of another passivating metal; the total content of oxides of metals of the platinum group in their active mass is above 50% (cf. British Pat. No. 1,168,558). The rate of consumption of the active mass of the anode containing (% by mass) $RuO_2$—53.3, $SiO_2$—37.5, $TiO_2$—9.2 determined by the method of variable polarity and amalgamation is equal, for 3 test cycles, to 0.75 mg/cm$^2$. A substantial disadvantage of all the prior art electrodes resides in a considerable rate of consumption of noble metal. Introduction of even considerable amounts of silica in combination with an oxide of a metal of the platinum group into the active mass does not ensure an increased stability of the latter.

Also known is an electrode, wherein onto a base of a passivating metal an active mass is deposited which contains more than 50% by mass of oxides of passivating metals, as well as oxides of metals of the platinum group and an additive, i.e. silica (cf. British Pat. No. 1,463,553, Cl.C25B 11/00, issued 2.02.1977). This electrode containing in the active mass 34.8% by mass of $RuO_2$, 61.6% by mass of $TiO_2$ and 3.6% of $SiO_2$ has the rate of consumption of the active mass as determined by the method of variable polarity and amalgamation of 0.7 mg/cm$^2$ for 3 test cycles. In other words, this electrode is substantially identical to the previously described electrode in terms of stability of its active mass, though it has an advantage over this latter electrode which resides in a lower rate of consumption of noble metal for its manufacture.

OBJECT OF THE INVENTION

It is an object of the present invention to provide an electrode for electrochemical processes which features a reduced rate of consumption of a metal of the platinum group for the manufacture of the electrode without, however, impairing its electrochemical characteristics, including the service life of the electrode.

BRIEF SUMMARY OF THE INVENTION

This object is accomplished by an electrode for electrochemical processes containing a current-conducting base of a passivating metal having deposited thereon an active mass of silica, oxides of passivating metals and oxides of metals of the group of platinum, the components being present in the active mass composition in the following proportions, percent by mass:

| | |
|---|---|
| silica | 10 to 90 |
| platinum group metal oxides | 5 to 45 |
| oxides of passivating metals | 5 to 45. |

The advisable amount of oxides of metals of the platinum group as specified above ensures a high electrochemical activity of the electrode, which is not substantially increased with increase in the content of this component up to 50% by mass and above, though it results in increased losses of the active mass in electrolysis, i.e. in a reduced stability of the electrode.

Introduction of oxides of passivating metals such as $TiO_2$ provides a positive effect on the electrode stability as compared to the electrode with its active mass consisting only of oxides of metals of the platinum group and silica.

It has been found that an increased stability of the active mass of the electrode is ensured at the content of silica exceeding 10% by mass and at the content of an oxide of a passivating metal such as $TiO_2$ of below 50% by mass and at the content of an oxide of a metal of the platinum group also below 50% by mass. Increasing the content silica of above 90% by mass causes a sharp drop of an electrochemical activity of the electrode.

The electrode according to the present invention may be embodied in different compositions containing the above-specified ingredients in the following proportions, in percent by mass:

| | |
|---|---|
| silica | 10 to 75 |
| platinum group metal oxides | 20 to 45 |
| oxides of passivating metals | 5 to 45, |
| or | |

| | |
|---|---|
| silica | 10 to 30 |
| platinum group metal oxides | 35 to 45 |
| oxides of passivating metals | 35 to 45. |

The electrode according to the present invention makes it possible to reduce the rate of consumption of the active mass containing an oxide of a metal of the group of platinum by approximately 20 to 25%. As to its electrocatalytic properties, the electrodes according to the present invention are similar to those of the prior art. Evaluation of the electrocatalytic activity has been performed by the value of anode potential relative to the normal reference hydrogen electrode under the conditions of chlorine electrolysis. The electrodes according to the present invention have potentials at anodic polarization equal to 1.32–1.35 V. relative to the normal reference hydrogen electrode at the current density of 0.2 A/cm$^2$, temperature of 90° C. in a solution containing 300 g/l of NaCl.

DETAILED DESCRIPTION OF THE INVENTION

For a better understanding of the present invention some specific Examples are given below by way of illustration.

EXAMPLE 1

An electrode is prepared which comprises a current-conducting substrate of a titanium plate with the dimensions of 20×30×2 with the active mass deposited thereon and having the following composition, in percent by mass: $SiO_2$—10, $RuO_2$—45, $TiO_2$—45. The electrode is manufactured in the following manner.

A titanium plate is degreased in a solution of 5% NaOH at the temperature of 60° C. for 10 minutes and etched for 10 minutes in a solution of HCl (20% by mass) at the temperature of 100° C.

For the deposition of the active mass a solution is prepared which contains 103 cm$^3$ of n-propyl alcohol, 1.84 cm$^3$ of $TiCl_4$, 0.55 cm$^3$ of $SiCl_4$ and 3.2 ml of a solution of ruthenium chloride with the concentration of ruthenium of 19.2% by mass. The solution is cast onto the finished titanium surface and the heat-treatment is conducted at a temperature within the range of from 370° to 470° C. The operation is repeated several times. The total content of ruthenium is equal to 3.5 g per one square meter of the electrode surface.

The electrode is then tested by the method of variable polarity and amalgamation.

The results illustrating variation of the rate of consumption of the active mass as determined by the method of variable polarity and amalgamation are shown in Table 2.

TABLE 2

| Number of test cycles | 1–3 | 4–6 | 7–9 | 10–12 |
|---|---|---|---|---|
| consumption rate of the active mass per every 3 test cycles, mg/cm$^2$ | 0.48 | 0.22 | 0.05 | 0.06 |

This electrode has been also tested as anode under the conditions of chlorine electrolysis in a solution of NaCl with its concentration of 300 g/l at the temperature of 90° C., anodic current density of 0.2 A/cm$^2$. The anode potential is equal to 1.32 V relative to the normal hydrogen electrode (NHE).

The prior art electrode with the composition of the active mass including (% by mass): $RuO_2$—46, $TiO_2$—54 has been tested by the method of variable polarity and amalgamation. The test results are shown in Table 1 above. As has been already mentioned, for the prior art electrode the rate of consumption of the active mass as measured by the radiochemical method under stationary conditions of chlorine electrolysis at a current density of 0.2–0.4 $A/cm^2$ is equal to $2.6 \times 10^{-8}$ $g/cm^2.hr$.

EXAMPLE 2

An electrode is prepared in a manner similar to that described in the foregoing Example 1, but with the active mass of the following composition, percent by mass: $SiO_2$—30; $RuO_2$—35; $TiO_2$—35.

For the deposition of the active mass a solution is prepared containing 61 $cm^3$ of n-propyl alcohol, 1.44 $cm^3$ of $TiCl_4$, 1.72 $cm^3$ of $SiCl_4$ and 2.52 $cm^3$ of a solution of ruthenium chloride.

The solution is cast onto a finished titanium surface and subjected to the heat-treatment of Example 1.

The electrode is then tested by the method of variable polarity and amalgamation. The results illustrating variation of the rate of consumption of the active mass as determined by the method of variable polarity and amalgamation are shown in Table 3 below.

TABLE 3

| Number of test cycles | 1–3 | 4–6 | 7–9 | 10–12 | 13–15 | 16–18 | 19–21 | 22–24 |
|---|---|---|---|---|---|---|---|---|
| Rate of consumption of the active mass per every 3 test cycles, $mg/cm^2$ | 0.47 | 0.27 | 0.155 | 0.086 | 0.098 | 0.100 | 0.073 | 0.086 |

The electrode has been also tested under the conditions of chlorine electrolysis described in Example 1; for the determination of the rate of consumption of ruthenium from the active mass the radiochemical method has been used at an anodic current density of 0.2–0.4 $A/cm^2$. The rate of consumption of ruthenium was $2.2 \times 10^{-8}$ $g/cm^2.hr$. The potential was equal to 1.33 V (NHE).

EXAMPLE 3

An electrode is prepared in a manner similar to that described in Example 1, except that the active mass has the following composition, percent by mass: $SiO_2$—35, $RuO_2$—20, $TiO_2$—45. For the deposition of the active mass a solution is prepared containing 65.5 $cm^3$ of n-propanol, 1.28 $cm^3$ of $TiCl_4$, 1.39 $cm^3$ of $SiCl_4$ and 1 $cm^3$ of a solution of ruthenium chloride. The solution is cast onto a finished titanium surface and subjected to the heat-treatment as in Example 1.

The electrode is tested by the method of variable polarity and amalgamation. The weight loss of the active mass for three cycles of testing is 0.50 $mg/cm^2$. The potential under the conditions of chlorine electrolysis as described in Example 1 is equal to 1.33 V (NHE).

EXAMPLE 4

An electrode is prepared in a manner similar to that of Example 1, except that its active mass has the following composition, percent by mass: $SiO_2$—75, $RuO_2$—20, $TiO_2$—5.

For the deposition of the active mass a solution is prepared containing 49.5 $cm^3$ of n-propanol, 0.1 $cm^3$ of $TiCl_4$, 2.08 $cm^3$ of $SiCl_4$ and 0.7 $cm^3$ of a solution of ruthenium chloride.

The solution is cast onto a finished titanium surface and subjected to the heat-treatment as in Example 1. The electrode is then tested by the method of variable polarity and amalgamation. The loss of the active mass for three cycles of testing is 0.41 $mg/cm^2$. The potential under the conditions of chlorine electrolysis as described in Example 1 is 1.35 V (NHE).

EXAMPLE 5

An electrode is prepared in a manner similar to that of Example 1, but with the active mass of the following composition; percent by mass: $SiO_2$—50, $RuO_2$—45, $TiO_2$—5.

For the deposition of the active mass a solution is prepared containing 54.0 $cm^3$ of n-propanol, 0.1 $cm^3$ of $TiCl_4$, 1.38 $cm^3$ of $SiCl_4$ and 1.58 $cm^3$ of a solution of ruthenium chloride.

The solution is deposited onto a finished titanium surface and subjected to the heat-treatment as in Example 1. The electrode is tested by the method of variable polarity and amalgamation. Losses of the active mass for three test cycles are equal to 0.33 $mg/cm^2$. The potential under the conditions of chlorine electrolysis as described in Example 1 is equal to 1.33 V (NHE).

EXAMPLE 6

An electrode is produced in a manner similar to that of Example 1, except that the active mass has the following composition, percent by mass: $SiO_2$—45.8, $RuO_2$—33.8, $TiO_2$—20.4.

For the deposition of the active mass a solution is prepared containing 34 $cm^3$ of n-propanol, 1.08 $cm^3$ of $SiCl_4$, $TiCl_4$—0.345 $cm^3$ and 1 $cm^3$ of a solution of ruthenium chloride.

The solution is cast onto a finished titanium surface and subjected to the heat-treatment as in Example 1. The electrode is tested by the method of variable polarity and amalgamation. These results illustrating variation of the rate of consumption of the active mass as determined by the method of variable polarity and amalgamation are shown in the following Table 4.

TABLE 4

| Number of test cycles | 1–3 | 4–6 | 7–9 |
|---|---|---|---|
| Rate of consumption of the active mass for every three test cycles, $mg/cm^2$ | 0.46 | 0.28 | 0.07 |

The potential under the conditions of chlorine electrolysis as described in Example 1 above is equal to 1.33 V (NHE).

EXAMPLE 7

An electrode is produced in a manner similar to that of Example 1, except that the active mass has the following composition, percent by mass: $SiO_2$—19.0, $RuO_2$—42.2, $ZrO_2$—38.8.

For the deposition of the active mass a solution is prepared containing 40 $cm^3$ of n-propyl alcohol, 0.830 g of $ZrCl_4$, 0.42 $cm^3$ of $SiCl_4$ and 1.05 $cm^3$ of a solution of ruthenium chloride. The solution is cast onto a finished titanium surface and subjected to the heat-treatment as in Example 1. The electrode is tested by the method of variable polarity and amalgamation. The rate of consumption of the active mass per three cycles of testing is 0.40 mg/cm$^2$. The potential under the chlorine electrolysis conditions described in Example 1 is equal to 1.32 V (NHE).

EXAMPLE 8

An electrode is prepared following the procedure similar to that of Example 1, except that the active mass has the following composition, percent by mass: SiO$_2$—10, IrO$_2$—45, TiO$_2$—45. For the deposition of the active mass a solution is prepared containing 40 cm$^3$ of n-propanol, 0.42 cm$^3$ of SiO$_2$, 1.05 cm$^3$ of a solution of iridium chloride, 0.4 cm$^3$ of TiCl$_4$. The solution is cast onto the finished surface of titanium and subjected to the heat-treatment as in Example 1. The electrode is tested by the method of variable polarity and amalgamation. The rate of consumption of the active mass for three cycles of testing is equal to 0.5 mg/cm$^2$. The potential under the conditions of chlorine electrolysis described in Example 1 is equal to 1.34 V (NHE).

Therefore, as is seen from the foregoing Examples, the electrodes according to the present invention feature a lower, by 20-25%, rate of consumption of the active mass and expensive noble metal as compared to the anodes with the active mass consisting of TiO$_2$ and RuO$_2$ widely employed in the art of chlorine electrolysis throughout the world.

What is claimed is:

1. An electrode for electrochemical processes, said electrode consisting essentially of a current-conducting base of a passivating metal having a layer of an active mass deposited thereon, said layer consisting of silica, oxides of passivating metals and oxides of metals of the platinum group, the components being present in the following proportions, in percent by mass:

| | |
|---|---|
| silica | 10–90 |
| platinum group metal oxides | 5–45 |
| oxides of passivating metals | 5–45. |

2. An electrode according to claim 1, wherein the active mass has the following composition, in percent by mass:

| | |
|---|---|
| silica | 10–75 |
| platinum group metal oxides | 20–45 |
| oxides of passivating metals | 5–45. |

3. An electrode according to claim 1, wherein the active mass has the following composition, in percent by mass:

| | |
|---|---|
| silica | 10–30 |
| platinum group metal oxides | 35–45 |
| oxides of passivating metals | 35–45. |

4. Electrode according to claim 1, wherein said passivating metal is selected from the group consisting of titanium, tantalum, zirconium, niobium and alloys of these metals.

5. Electrode according to claim 4, wherein said platinum group metal is selected from the group consisting of ruthenium and iridium.

* * * * *